(12) United States Patent
Stroppiana

(10) Patent No.: US 6,545,113 B2
(45) Date of Patent: *Apr. 8, 2003

(54) METHOD OF PRODUCING RUBBER-BASED COVERINGS AND INTERMEDIATE AND FINAL PRODUCTS PRODUCED BY THE METHOD

(75) Inventor: Fernando Stroppiana, Grinzane Cavour (IT)

(73) Assignee: Mondo S.p.A. (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/342,791

(22) Filed: Jun. 29, 1999

(65) Prior Publication Data

US 2003/0006522 A1 Jan. 9, 2003

(30) Foreign Application Priority Data

Jun. 29, 1998 (IT) .......................... TO98A0558

(51) Int. Cl.$^7$ ............................... C08C 4/00
(52) U.S. Cl. ................... 526/335; 528/502 C; 264/109; 264/331.13
(58) Field of Search ............. 526/335; 528/502 C; 264/109, 115, 331.13

(56) References Cited

U.S. PATENT DOCUMENTS

| | | | | |
|---|---|---|---|---|
| 1,970,469 A | * | 8/1934 | Murphy | ............. 264/331.13 X |
| 4,793,787 A | | 12/1988 | Schermutzki | |
| 5,217,554 A | | 6/1993 | Stroppiana | |
| 5,654,370 A | * | 8/1997 | Datta et al. | ............. 526/282 X |

FOREIGN PATENT DOCUMENTS

| | | |
|---|---|---|
| DE | 3546151 A1 | 7/1987 |
| DE | 3546215 A1 | 7/1987 |
| DE | 4319059 A1 | 12/1994 |
| DE | 4340478 A | 6/1995 |
| DE | 4435700 A | 4/1996 |
| DE | 19623790 A1 | 12/1997 |
| DE | 19649708 C1 | 2/1998 |
| EP | 0321760 A1 | 6/1989 |
| EP | 0512197 A1 | 11/1992 |
| EP | 0755764 A1 | 1/1997 |

* cited by examiner

Primary Examiner—Fred Teskin
(74) Attorney, Agent, or Firm—TraskBritt

(57) ABSTRACT

A method of producing a rubber-based covering comprising at least one layer formed from fragmented cohesible material comprises the steps of forming a substantially continuous bed of the fragmented cohesible material and subjecting the material of the bed to a compacting step so as to form a sheet material as a result of the cohesion of the material. The compaction step is performed with a substantial absence of stretching stresses on the fragmented material.

3 Claims, 2 Drawing Sheets

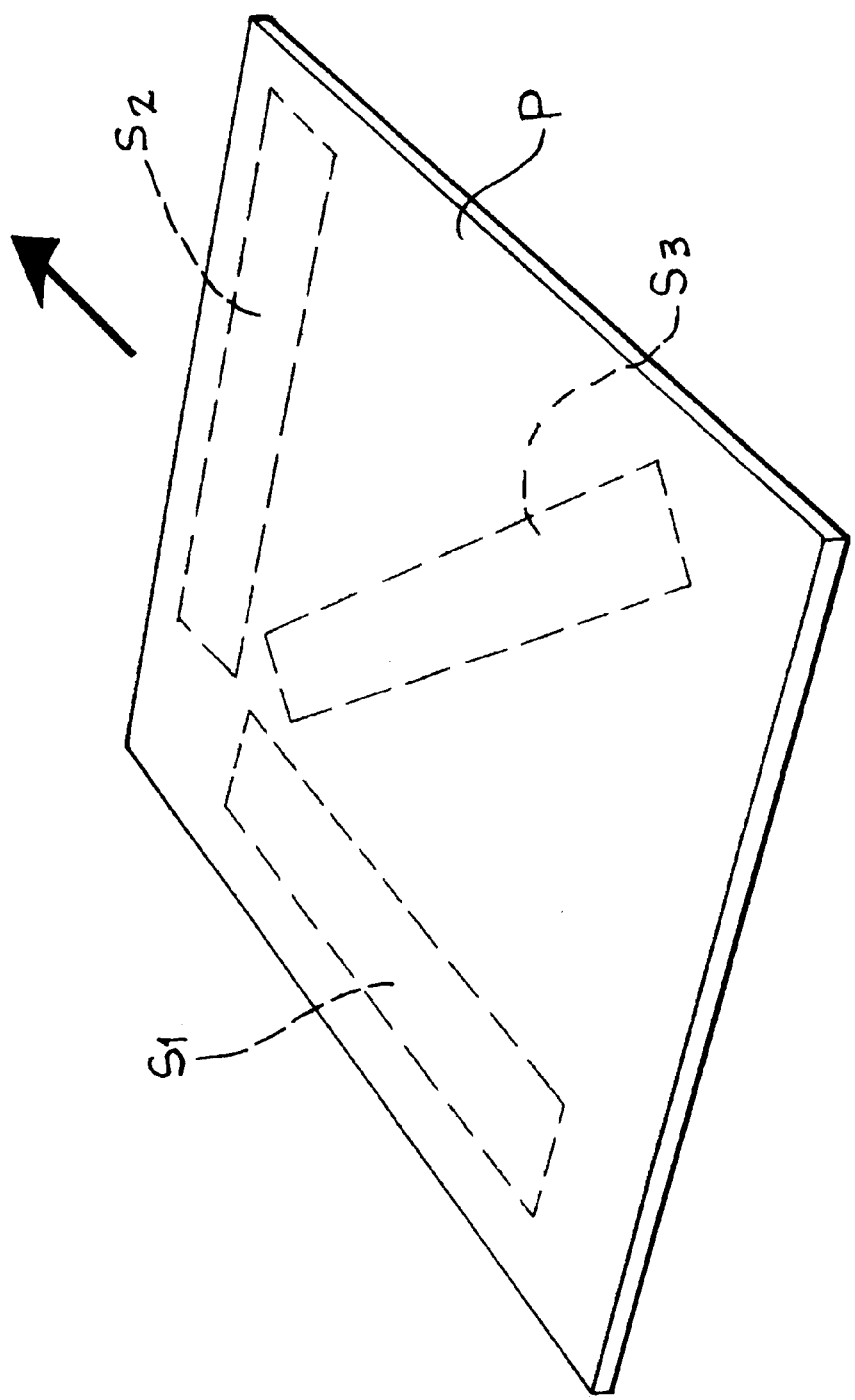

Figure 1:
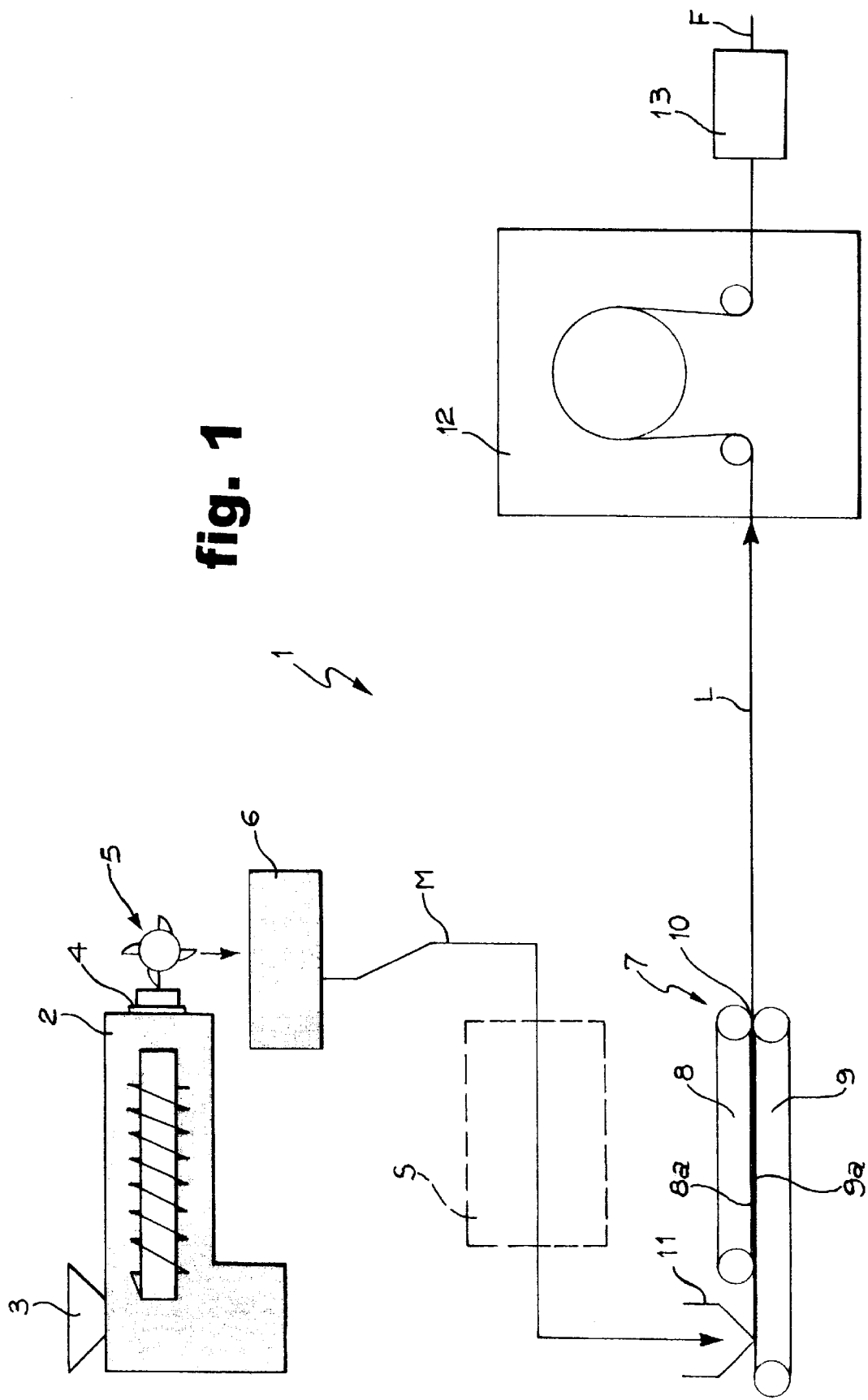

METHOD OF PRODUCING RUBBER-BASED COVERINGS AND INTERMEDIATE AND FINAL PRODUCTS PRODUCED BY THE METHOD

The present invention relates to methods of producing rubber-based coverings. A method of this type is known, for example, from U.S. Pat. No. 5 217 554.

During the production of coverings of the type specified above, problems arise in connection both with the appearance of the covering and with requirements of a technical and structural nature such as, for example, the need to produce a covering with good resistance to mechanical stresses, for example, to bending, or the need to ensure that the covering has good dimensional stability.

With regard to this latter aspect in particular, it has been found that rubber-based coverings produced in conventional manner by a calendering operation may show physical and mechanical characteristics which are not isotropic since they are influenced by the direction (longitudinal or transverse the direction of working) in which the measurement is made.

Without wishing to be bound to any specific theory in this connection, there is reason to believe that this is due to a "stretching" effect on the granules in the direction of calendering, this effect being intrinsic in this operation.

The deformation or stretching of the granules which is in any case brought about by the calendering may also have the disadvantage of giving the appearance of the covering a directional character, rendering the direction of calendering recognizable upon optical inspection of the covering.

The object of the present invention is to provide a method which permits the production of a rubber-based covering having excellent structural properties both with regard to resistance to deformation and with regard to dimensional stability, and the aesthetic characteristics of which can be modified with considerable flexibility according to requirements and taste.

In this connection, it is important to stress that the present invention relates to rubber-based coverings (with the meaning specified below) and, from this point of view, is distinguished from techniques relating to the manufacture of coverings based on thermoplastic materials (such as, for example, PVC, polyolefins or so-called thermoplastic rubbers which are actually constituted by a polyolefin matrix in which a vulcanized rubber phase is finely dispersed). In this field, current practice is to produce a bed or mat of granules which is then subjected to a hot rolling process usually having the character of a calendering operation. The softening of the granules thus brought about causes the formation of a continuous sheet. Naturally, the above-described intrinsic disadvantages of calendering remain.

According to the present invention, the object indicated above is achieved by means of a method of producing rubber-based coverings having the further specific characteristics recited in the following claims. A further subject of the invention is the intermediate and final products of the method which are distinguished by the basically non-directional (isotropic) nature of their physical, mechanical and aesthetic characteristics.

The invention will now be described, purely by way of non-limiting example, with reference to the appended drawings, in which:

FIG. 1 shows schematically a possible embodiment of a method according to the invention, and FIG. 2 shows a final product which can be produced by the method, together with the methods by which the characteristics of the product can be determined.

In FIG. 1, a plant for producing coverings such as, for example, rubber-based floorings, is generally indicated 1.

The term "rubber" as used in the present description and in the following claims, is intended in general to define any elastomer which can be vulcanized/cross-linked and which can be used for the manufacture of coverings such as floorings. A material of this type may adopt the appearance of fragments or particles (for example, granules) and can be termed "cohesible" in that it can be rendered cohesive so as to form, for example, a sheet or a layer.

Typical examples of this type are artificial or synthetic rubber (for example, the synthetic rubbers known by the names SBR (styrene-butadiene-rubber), NBR (nitrile-butadiene-rubber) and EPDM (ethylene-propylene-diene-monomer), natural rubber, and mixtures thereof.

The invention can thus be applied to the processing of materials which can be vulcanized/cross-linked and hence, in general, which are "curable" and, most preferably but not exclusively, materials which are initially in the form of granules. The term "fragmented material" used in the claims, however, indicates, in general, any material in pieces and, as such, also includes particular morphologies such as pellets, flattened or rod-shaped granules, threads, strips, etc., or shavings such as those produced by the scraping or shaving operation described in U.S. Pat. No. 5,217,554.

With further reference to the diagram of FIG. 1, an extruder, generally indicated 2, has an inlet opening 3 to which the basic material for producing the covering is supplied.

The extruder 2 may be any commercially available extruder which can process materials such as those indicated above.

In the embodiment considered in detail below—which is described by way of example—it will be assumed that the material in question is constituted by synthetic rubber (typically styrene-butadiene rubber which has not yet been vulcanized) which is supplied to the opening 3 of the extruder 2 in the form of continuous and/or discontinuous strips, for example with a thickness of a few millimetres and a width of a few centimetres.

In particular, when a covering with a non-uniform appearance is to be produced, the strips are taken from an assortment of strips having two or more different colours. However, the invention may also be used to produce coverings of substantially uniform surface appearance.

The material supplied to the opening 3 is passed through the barrel of the extruder 2 until it reaches a die 4 having one or more extrusion openings, each of which can produce a thread, for example, of variegated colour if the input strips are of different colours. The thread in question may have diametral dimensions of a few millimetres (for example 4–6 mm).

In the region of the die 4, on the path along which the material is output from the extruder 2, there is a granulating head 5 (for example, in the form of a rotary blade) which divides the material in thread form emerging from the die 4 into individual granules substantially comparable to disk-shaped pellets having, for example, a diameter of 4–6 mm and a thickness of the order of 0.5–1 mm.

The granulated material M thus produced, which is usually collected in a container 6, is supplied—possibly after storage indicated schematically by a block S shown in broken outline in FIG. 1—to the input of a compacting unit 7. It is pointed out once more that the particular form of fragmentation may vary widely within the scope of the invention. In particular, the scraping/shaving technique described in U.S. Pat. No. 5,217,554 may advantageously be used to produce the fragmented material.

The unit 7 is intended basically to compact the material M so as to give rise, precisely owing to the properties of cohesiveness of the fragments thereof, to a substantially continuous laminar layer or sheet L.

This avoids giving rise to the stretching phenomena intrinsically connected with a calendering operation.

In the embodiment shown, the unit 7 is configured substantially as a so-called continuous or isostatic press. Presses of this type are known in the art, for example, from the production of IsoPress presses by the company Hymmen GmbH (Germany).

Basically, the unit 7 is composed of two endless, motor-driven belts 8, 9 of which mutually facing passes 8a, 9a define a compacting chamber 10 in which controlled pressure and temperature conditions can be maintained (in accordance with known criteria).

The fragmented material M is deposited at the input of the unit 7 by means of a metering device 11 (for example of the hopper type) so as to define a substantially continuous bed or mat having, for example a thickness of from about 2 to about 10 mm, with currently-preferred values of about 4–6 mm.

It will be appreciated, in this connection, that the aforementioned deposition may take place either directly onto the lower belt 9 of the press or onto an interposed laminar substrate. This substrate may be constituted by a substrate from which the fragmented material has been produced in accordance with the solution described in U.S. Pat. No. 5,217,554.

Limited temperatures, typically of from about 60° C. to about 100° C. with preferred values of approximately 80° C. are maintained in the unit 7. The pressure values may be between about 2 and about 5 MPa.

As it advances through the unit 7, the bed of fragmented material M is compressed between the two belts 8 and 9 (possibly with the interposition of the deposition substrate, if one is present), and is compacted to form a sheet L which is rendered mechanically coherent by the cohesion of the granules of the material M. This sheet—which is compacted but not yet vulcanized, and is hence constituted by "raw", cohesive material—may be removed from the unit 7 to go on to other processes, possibly after storage/transportation.

The sheet L therefore clearly constitutes, according to the invention, an intermediate product with an independent character.

The precision and/or intensity of the compacting are increased by the capability for precise control of the compacting pressure offered by isostatic presses.

Without wishing in any way to be restricted to any specific theory in this connection, the Applicant has reason to believe that the way in which the above-described compacting of the material M is performed avoids the typical longitudinal stretching effect of calendering processes precisely because of the substantially isostatic distribution of the stresses induced locally in the material M. This effect can be attributed, in the embodiment described, to the presence of the belts 8, 9, and hence to the fact that the compression effect is distributed over an extensive surface area with a direction of action perpendicular to the surface. This contrasts with what occurs in normal calenders, in which the compression of the calendered material is concentrated in the narrow regions in which the rollers cooperate and, in any case, has components directed along the plane of the calendering product.

Moreover, it should not be forgotten that, in most calenders, an at least marginal differentiation of the peripheral velocities of the rollers is deliberately aimed for; clearly, this factor induces significant stretching in the material subjected to calendering.

Similarly, it will be understood that the desired effect—compacting by compression with a substantial absence of stretching stresses along the sheet L—can be achieved in various ways with the same final result; a linear press which compresses portions of the bed or mat successively supplied to the press may be mentioned by way of practical example.

The sheet or layer of material L may then be supplied to apparatus 12 in which the material L is subjected to a cross-linking treatment by the application of pressure and/or heat. For example, this may be the treatment currently defined by the trade name "Rotocure".

Typical parameters for performing a treatment of this type (with reference to a starting material constituted by synthetic rubber) are represented by temperatures of between 150° C. and 190° C. and pressures of between 0.5 and 2 MPa.

In accordance with wholly conventional techniques, the Rotocure treatment may be implemented in a manner such that the appearance of the opposite flat surfaces of the resulting product F is completely smooth or, particularly in the case of the outer or upper surface of the covering, slightly marbled or rough, for example, with an anti-slip function, when the final product F is intended for use as flooring, in substantially the same manner as is normal for coverings intended for this use.

Finally, the product emerging from the unit 12 may be subjected to various finishing or grinding operations, to the application of protective layers, to cutting into strips or tiles, etc.

These operations, which are performed in accordance with known criteria, are collectively indicated 13.

The final product F may typically have the appearance of a flooring tile P, as shown schematically in FIG. 2.

The most distinctive aspect both of the final product F and of the intermediate product L of the covering produced in accordance with the invention is the intrinsically non-directional (isotropic) nature of its characteristics.

This relates both to its physical and mechanical characteristics and to its aesthetic characteristics, at least with regard to the appearance of the outer or upper layer.

In particular, the Applicant has performed various tests on samples of floorings produced according to the invention from SBR rubber.

The flooring in question had a thickness of about 2 mm. Samples S1, S2, S3 (see FIG. 2) in the form of 27 cm×7 cm rectangles were cut from the flooring in a longitudinal direction (S1), in a transverse direction (S2), and in a diagonal direction at 45° to the longitudinal direction (arrow of FIG. 2) (S3), respectively, from the strip F produced by the continuous process shown in FIG. 1.

Visual inspection of the upper face (the walking surface), even at short distance, consistently showed that the samples of the three types S1, S2 and S3 did not differ from one another.

This characteristic is important, particularly when the flooring is being laid, since it enables joints which are not perceptible from a normal observation height to be formed between sheets and/or tiles, regardless of the orientation of the sheets and of the tiles.

The following physical and mechanical tests were also carried out.

Flexibility tests (EN 435—Method A) and dimensional stability tests (EN 434) within the scope of the standard EN 1817 (March 1998 version) were carried out on longitudinal strips S1 and transverse strips S2 of the dimensions given above, produced from a covering according to the invention, with homogeneous structure throughout its thickness. Breaking load/extension tests (DIN 53504) and tear-resistance tests (DIN 53515) were also carried out.

The results of the tests are given in the following tables.

TABLE 1

Flexibility

| Sample No. | Longitudinal (S1) | Transverse (S2) |
| --- | --- | --- |
| 1 | absence of cracks | absence of cracks |
| 2 | absence of cracks | absence of cracks |
| 3 | absence of cracks | absence of cracks |
| 4 | absence of cracks | absence of cracks |

TABLE 2

Dimensional stability

| | Longitudinal | Transverse |
| --- | --- | --- |
| 4 samples | −0.12% | +0.04% |

(The maximum value permitted by the standard EN 434 is +/−0.4%).

TABLE 3

Breaking load/extension

| Sample No. | Longitudinal MPa (S1) | Transverse MPa (S2) |
| --- | --- | --- |
| 1 | 5.64 | 5.91 |
| 2 | 5.73 | 5.59 |
| 3 | 5.23 | 5.70 |
| 4 | 5.90 | 5.45 |
| mean value | 5.63 | 5.66 |

TABLE 4

Tear resistance

| Sample No. | Longitudinal N/mm2 (S1) | Transverse N/mm2 (S2) |
| --- | --- | --- |
| 1 | 29.8 | 33.2 |
| 2 | 26.3 | 28.4 |

TABLE 4-continued

Tear resistance

| Sample No. | Longitudinal N/mm2 (S1) | Transverse N/mm2 (S2) |
| --- | --- | --- |
| 3 | 33.3 | 28.1 |
| 4 | 27.8 | 28.5 |
| mean value | 29.3 | 29.5 |

Naturally, the principle of the invention remaining the same, the details of construction and forms of embodiment may be varied widely with respect to those described and illustrated, without thereby departing from the scope of the present invention.

What is claimed is:

1. A rubber-based covering comprising at least one laminar continuous sheet constituted by a fragmented, cohesive rubber-based material, the sheet being isotropic both upon visual inspection and with regard to mechanical stresses.

2. A rubber-based covering comprising at least one laminar continuous sheet constituted by a fragmented, cohesive rubber-based material, the continuous sheet being isotropic both upon visual inspection and with regard to mechanical stresses, wherein said covering is obtained by forming a substantially continuous bed of the fragmented material and subjecting the material of the bed to a compacting step so as to form a continuous sheet material as a result of the cohesion of the material, wherein the compacting step is performed with a substantial absence of stretching stresses on the fragmented material.

3. An intermediate product of a method of producing a covering comprising at least one continuous sheet formed from fragmented cohesible rubber-based material, the method comprising the steps of forming a substantially continuous bed of the fragmented material and subjecting the material of the bed to a compacting step so as to form a continuous sheet material as a result of the cohesion of the material, wherein the compacting step is performed with a substantial absence of stretching stresses on the fragmented material, said intermediate product comprising at least one continuous sheet of fragmented, rubber-based material compacted in a cohesive condition with an absence of vulcanization/cross-linking and of stretching stresses on the fragmented material along the at least one continuous sheet.

* * * * *